United States Patent
Lee

(10) Patent No.: US 8,151,124 B2
(45) Date of Patent: Apr. 3, 2012

(54) APPARATUS AND METHOD FOR FORCIBLY SHUTTING DOWN SYSTEM

(75) Inventor: Jung-Hwan Lee, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 513 days.

(21) Appl. No.: 12/370,701

(22) Filed: Feb. 13, 2009

(65) Prior Publication Data

US 2009/0313487 A1    Dec. 17, 2009

(30) Foreign Application Priority Data

Jun. 17, 2008    (KR) .................. 10-2008-0057059

(51) Int. Cl.
*G06F 1/30* (2006.01)
*G06F 1/28* (2006.01)

(52) U.S. Cl. ........ 713/300; 713/320; 713/323; 713/324; 713/340

(58) Field of Classification Search .................. 713/300, 713/320, 323, 324, 340
See application file for complete search history.

(56) References Cited

U.S. PATENT DOCUMENTS

| | | | |
|---|---|---|---|
| 6,442,702 B1 * | 8/2002 | Ishikawa et al. ............. | 713/340 |
| 6,920,580 B1 * | 7/2005 | Cramer et al. ............... | 714/4.11 |
| 7,107,472 B2 * | 9/2006 | Weinold ....................... | 713/324 |
| 2007/0188150 A1 * | 8/2007 | Yamaguchi et al. .......... | 320/136 |
| 2008/0080625 A1 * | 4/2008 | Miyata .......................... | 375/257 |

FOREIGN PATENT DOCUMENTS

KR    10-2000-0015310    3/2000

* cited by examiner

*Primary Examiner* — Vincent Tran
(74) *Attorney, Agent, or Firm* — Birch, Stewart, Kolasch & Birch, LLP

(57) ABSTRACT

The present invention relates to an apparatus and method for forcibly shutting down a computer system, and more specifically, to an apparatus and method for forcibly shutting down a system when the system is determined to be in an abnormal state. An apparatus for forcibly shutting down a system according to a specific embodiment of the present invention comprises a reception unit 10 for receiving a power management control signal; a power state detection unit 20 for detecting a current power state of the system; a determination unit 30 for determining whether a system execution state is normal by comparing the power management control signal received by the reception unit 10 and a detection result of the power state detection unit 20; and a forced-shutdown unit 40 for forcibly shutting down the system when the system execution state is determined to be abnormal by the determination unit 30. According to the present invention so configured, there are advantages in that when an error occurs in a computer system and the system operation is inadvertently suspended while the system is not shut down, the system is forcibly shut down, whereby continuous consumption of battery power can be prevented, and danger of accident occurring due to an increase in battery temperature can be prevented.

16 Claims, 9 Drawing Sheets

APPARATUS AND METHOD FOR FORCIBLY SHUTTING DOWN SYSTEM

CROSS REFERENCE TO RELATED APPLICATIONS

The present application is related to, and claims priority to, Korean patent application No. 10-2008-0057059 filed on Jun. 17, 2008 in Republic of Korea, the entire contents of which being incorporated herein by reference.

BACKGROUND OF THE INVENTION

1. Field of the Invention

The present invention relates to an apparatus and method for forcibly shutting down a computer system, and more specifically, to an apparatus and method for forcibly shutting down a system when the system is determined to be in an abnormal state.

2. Description of the Related Art

Generally, a computer system of present days includes a system memory and a central processing unit connected to each other. The central processing unit and the system memory exchange data and a plurality of control signals through a host bridge. The host bridge provides an interface among a plurality of different constitutional components within the computer system. For example, a keyboard, a mouse, disk drives, and the like are connected through an input/output bridge, and the input/output bridge is connected to the host bridge to provide interfaces between a plurality of peripheral devices, the central processing unit, and memory subsystems.

In the meantime, if power is supplied to an embedded computer system, the central processing unit loads a BIOS program stored in ROM onto a system RAM and executes BIOS and POST routines, and the POST routine is configured to have program codes for testing whether system resources, such as a central processing unit, a memory, a graphic card, and a hard disk, normally operate.

If the POST routine is executed and then each component of the system normally operates, the operating system (OS) is driven to search for setting information on system hardware and software and to prepare the system for operation.

In the meantime, since devices of the system and drivers for driving the devices should be searched for when the system is booted, there is a problem in that booting time is extended. In order to solve the above problem, a hibernation mode (S4 mode) has been adopted, in which contents of a main memory are stored in a certain portion of the hard disk when the system is shut down, and the system information stored in the hard disk is read by the main memory in the next booting to thereby boot the system in the state before the shut down.

However, the prior art as described above has following problems.

That is, there may be cases where a computer system abnormally operates and the operation of the system is suspended while the system is not shut down. At this time, there is a problem in that the battery continuously consumes power and is discharged even though the system is in an abnormal state.

Furthermore, in the prior art, when the system is not normally shut down and the battery is continuously consumed, there is danger of accident since temperature of the battery rises.

SUMMARY OF THE INVENTION

Accordingly, the present invention is conceived to solve the aforementioned problems in the prior art. An object of the present invention is to provide an apparatus and method for forcibly shutting down a system in order to prevent continuous consumption of power of a battery when an error occurs in the computer system and the system operation is inadvertently suspended while the system is not shut down.

Another object of the present invention is to provide an apparatus and method for forcibly shutting down a system while the system is in an abnormal state in order to prevent danger of accident which may occur when the system is not shut down normally and thus battery power is continuously consumed and temperature of the battery rises.

According to an aspect of the present invention for achieving the objects, there is provided an apparatus for forcibly shutting down a system, which comprises a reception unit for receiving a power management control signal; a power state detection unit for detecting a current power state of the system; a determination unit for determining whether a system execution state is normal by comparing the power management control signal received by the reception unit and a detection result of the power state detection unit; and a forced-shutdown unit for forcibly shutting down the system when the system execution state is determined to be abnormal by the determination unit.

At this time, the power state detection unit may detect the current power state of the system by sensing voltage supplied to each constitutional component of the system.

In addition, when the reception unit receives a control signal related to system shutdown, the detection unit may determine the system execution state to be abnormal if voltage supplied to a reference constitutional component for determining whether the system enters a system shutdown state is not 0V.

Further, when the reception unit receives a control signal related to entering a specific power saving mode, the determination unit may determine the system execution state to be abnormal if voltage supplied to a reference constitutional component for determining whether the system enters the power saving mode is not 0V.

At this time, the reference constitutional component may be a constitutional component to which power supply is suspended as the system enters the system shutdown or power saving mode.

In addition, the power state detection unit may detect the current power state of the system by sensing power consumption of the system.

Further, when the reception unit receives a control signal related to system shutdown, the determination unit may determine the system execution state to be abnormal if the power consumption of the system is higher than a reference value.

At this time, when the reception unit receives a control signal related to entering a specific power saving mode, the determination unit may determine the system execution state to be abnormal if the power consumption of the system is higher than a reference value corresponding to the power saving mode.

In addition, the reference value may be set based on power consumption of the system measured when the system normally enters the system shutdown or power saving mode.

Further, the power state detection unit may detect the current power state by sensing a level of a power management signal indicating whether the system enters a specific power state.

At this time, when the reception unit receives a control signal related to system shutdown, the determination unit may determine the system execution state to be abnormal if the power management signal indicating that the system enters a system shutdown state is sensed to be in an inactive state.

In addition, when the reception unit receives a control signal related to entering a specific power saving mode, the determination unit may determine the system execution unit to be abnormal if the power management signal indicating that the system enters the power saving mode is sensed to be in an inactive state.

Further, when the power management control signal received by the reception unit does not correspond to the detection result of the power state detection unit, the determination unit may determine whether the system execution state is normal by transmitting a response request message to each constitutional component of the system and receiving a response message corresponding to the response request message.

At this time, when the reception unit receives the power management control signal, the power state detection unit may detect the current power state of the system after a set time is elapsed.

In the meantime, the present invention provides a method for forcibly shutting down a system, which comprises the steps of (a) receiving a power management control signal; (b) detecting a current power state of the system; (c) determining whether a system execution state is normal by comparing the power management control signal and a result of the detection; and (d) forcibly shutting the system when the system execution state is determined to be abnormal.

At this time, step (b) may be performed by sensing voltage supplied to each constitutional component of the system.

In addition, when a control signal related to system shutdown is received, step (c) may be performed by determining the system execution state to be abnormal if voltage supplied to a reference constitutional component for determining whether the system enters a system shutdown state is not 0V.

Further, when a control signal related to entering a specific power saving mode is received, step (c) may be performed by determining the system execution state to be abnormal if voltage supplied to a reference constitutional component for determining whether the system enters the power saving mode is not 0V.

At this time, the reference constitutional component may be a constitutional component to which power supply is suspended as the system enters the system shutdown or power saving mode.

In addition, step (b) may be performed by sensing power consumption of the system.

Further, when a control signal related to system shutdown is received, step (c) may be performed by determining the system execution state to be abnormal if the power consumption of the system is higher than a reference value.

At this time, when a control signal related to entering a specific power saving mode is received, step (c) may be performed by determining the system execution state to be abnormal if the power consumption of the system is higher than a reference value corresponding to the power saving mode.

In addition, the reference value may be set based on power consumption of the system measured when the system normally enters the system shutdown or power saving mode.

Further, step (b) may be performed by sensing a level of a power management signal indicating whether the system enters a specific power state.

At this time, when a control signal related to system shutdown is received, step (c) may be performed by determining the system execution state to be abnormal if the power management signal indicating that the system enters a system shutdown state is sensed to be in an inactive state.

In addition, when a control signal related to entering a specific power saving mode is received, step (c) may be performed by determining the system execution unit to be abnormal if the power management signal indicating that the system enters the power saving mode is sensed to be in an inactive state.

Further, when the control signal does not correspond to the result of the detection, step (c) may be performed by determining whether the system execution state is normal by transmitting a response request message to each constitutional component of the system and receiving a response message corresponding to the response request message.

At this time, when the power management control signal is received, step (b) may be performed by detecting the current power state of the system after a set time is elapsed.

According to the apparatus and method for forcibly shutting down a system according to the present invention as described above in detail, the following effects can be expected.

That is, there is an advantage in that when an error occurs in a computer system and the system operation is inadvertently suspended while the system is not shut down, the system is forcibly shut down, whereby continuous consumption of battery power can be prevented.

In addition, according to the present invention, a system is forcibly shut down when the system is not shut down normally. Thus, there is an advantage in that danger of accident occurring due to continuous consumption of a battery and an increase in battery temperature can be prevented.

BRIEF DESCRIPTION OF THE DRAWINGS

The features and advantages of the present invention will be described in more detail in preferred embodiments with reference to the accompanying drawings, in which.

DESCRIPTION OF THE PREFERRED EMBODIMENT

Hereinafter, preferred embodiments of an apparatus for forcibly shutting down a system according to the present invention will be described in detail with reference to the accompanying drawings.

Figure 1:
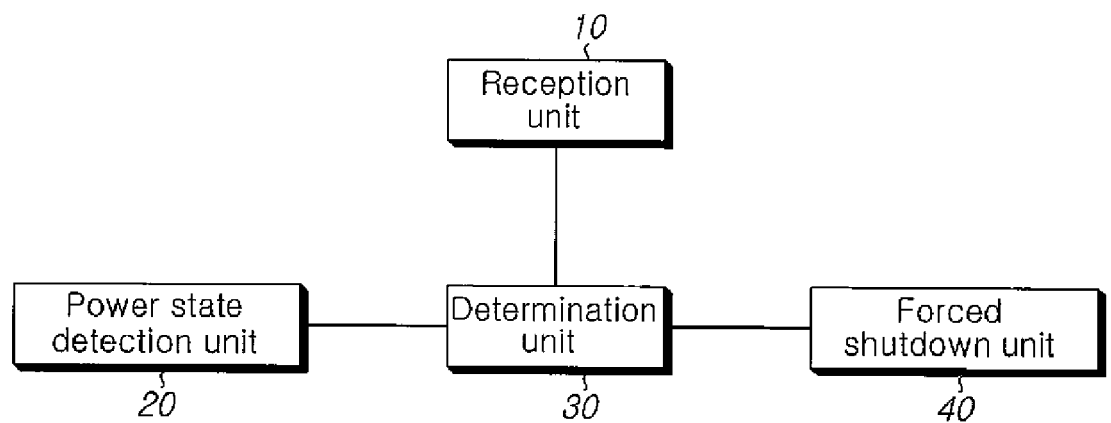
FIG. 1 is a block diagram showing an apparatus for forcibly shutting down a system of a specific embodiment of the present invention.

FIG. 1 is a block diagram showing an apparatus for forcibly shutting down a system of a specific embodiment of the present invention.

As shown in FIG. 1, an apparatus for forcibly shutting down a system according to the specific embodiment of the present invention comprises a reception unit 10.

The reception unit 10 receives a power management control signal. Here, the power management control signal means a control signal for controlling a power state of a system depending on a user command, predetermined conditions, or the like.

That is, the reception unit 10 receives a control signal related to system shutdown from an operating system (OS), or a control signal related to entering one of S3, S4, and S5 modes conforming to the Advanced Configuration and Power Interface (ACPI) power management specification.

Meanwhile, the apparatus for forcibly shutting down a system according to the specific embodiment of the present invention comprises a power state detection unit 20.

The power state detection unit 20 detects a current power state of the system.

This is to determine whether the system execution state is normal by comparing the current power state with a power state corresponding to a power management control signal received by the reception unit 10 and determining whether they correspond to each other.

That is, when the reception unit 10 receives a power management control signal, the power state detection unit 20 detects a current power state of the system after a set time is elapsed in order to determine whether the system execution state is normal according to the power management control signal received by the reception unit 10.

At this time, the set time is set based on a time required to enter a power state according to the power management control signal received by the reception unit 10. For example, if the reception unit 10 receives a control signal related to transition to the S3 mode, the set time is set to a time required for the system to enter the power state of the S3 mode.

In addition, the power state detection unit 20 detects the current power state of the system by sensing voltage supplied to each constitutional component, sensing power consumption of the system, or detecting a level of a power management signal indicating whether the system enters a specific power state.

Here, specific embodiments according to a method in which the power state detection unit 20 detects a current power state of the system will be described below.

In the meantime, the apparatus for forcibly shutting down a system according to the specific embodiment of the present invention comprises a determination unit 30.

The determination unit 30 determines whether the system execution state is normal by comparing the power management control signal received by the reception unit 10 with a detection result of the power state detection unit 20.

In addition, when the power management control signal received by the reception unit 10 does not correspond to the detection result of the power state detection unit 20, the determination unit 30 may determine whether the system execution state is normal by additionally transmitting a response request message to each constitutional component of the system and receiving a response message corresponding to the response request message.

Then, the determination unit 30 determines whether the system execution state is normal based on voltage supplied to each constitutional component of the system, power consumption of the system, or a level of the power management signal indicating whether the system enters a specific power state according to a method of detecting a current power state of the system by the power state detection unit 20.

Here, specific embodiments according to a method in which the determination unit 30 determines whether the system execution state is normal will be described below.

Meanwhile, the apparatus for forcibly shutting down a system according to the specific embodiment of the present invention comprises a forced-shutdown unit 40.

The forced-shutdown unit 40 forcibly shuts down the system when the system execution state is determined to be abnormal by the determination unit 30.

This is to prevent continuous consumption of battery power and danger of accident occurring due to an increase in battery temperature when an error occurs in the computer system and the operation of the system is inadvertently suspended while the system is not shut down.

For example, when there is a system shutdown command inputted by a user, the reception unit 10 receives a control signal related to system shutdown, and the power state detection unit 20 detects a current power state of the system. At this time, the determination unit 30 determines that the system execution station is abnormal when the system is currently not shut down as a result of detection performed by the power state detection unit 20, and the forced-shutdown unit 40 forcibly shuts down the system, thereby enabling power of the system to be prevented from being continuously consumed while the system operation is suspended.

Hereinafter, each embodiment of the apparatus for forcibly shutting down a system according to the present invention will be described based on contents of information sensed for detecting a current power state of the system.

First, according to a first embodiment of the present invention, the power state detection unit 20 detects a current power state of the system by sensing voltage supplied to each constitutional component of the system.

At this time, when the reception unit 10 receives a control signal related to system shutdown, the determination unit 30 determines whether the system execution state is normal depending on whether the voltage supplied to each constitutional component of the system is 0V, which is sensed by the power state detection unit 20. That is, if the voltage supplied to each constitutional component of the system is sensed not to be 0V, the system execution state is determined to be abnormal.

Meanwhile when the reception unit 10 receives a control signal related to entering a specific power saving mode, the determination unit 30 determines that the system execution state is abnormal if voltage supplied to a reference constitutional component for determining whether the system enters the power saving mode is not 0V.

For example, when the reception unit 10 receives a control signal related to entering any one of the S3, S4, and S5 modes, the determination unit 30 determines whether the system execution state is normal depending on whether voltage supplied to a reference constitutional component for determining whether the system enters a corresponding mode is 0V.

Here, the reference constitutional component is a constitutional component to which power supply is suspended depending on entering the specific power saving mode.

That is, any one of constitutional components in which power is supplied in an S0 mode and power supply is suspended in the S3 mode can be selected as a reference constitutional component corresponding to the S3 mode.

For example, assuming power supply to the CPU is suspended when the system enters the S3 mode while the power is supplied to the CPU in the S0 mode, the CPU can be a reference constitutional component for determining whether the system enters the S3 mode. At this time, if the voltage supplied to the CPU is sensed not to be 0V, the determination unit 30 determines that the system execution state is abnormal.

Figure 2A:
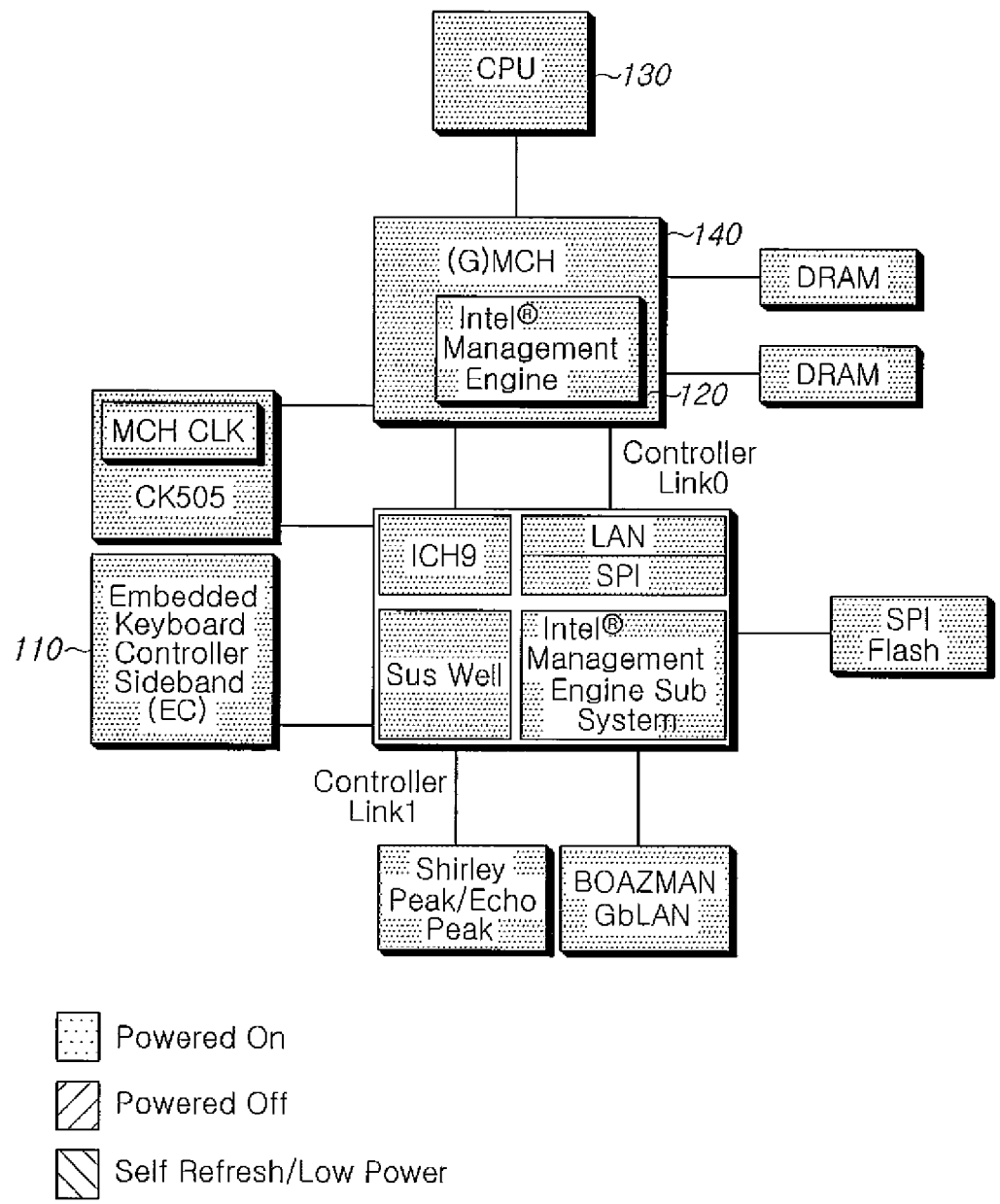
FIG. 2a is a block diagram showing power supplying states for respective constitutional components of a system in an S0 mode.
Figure 2B:
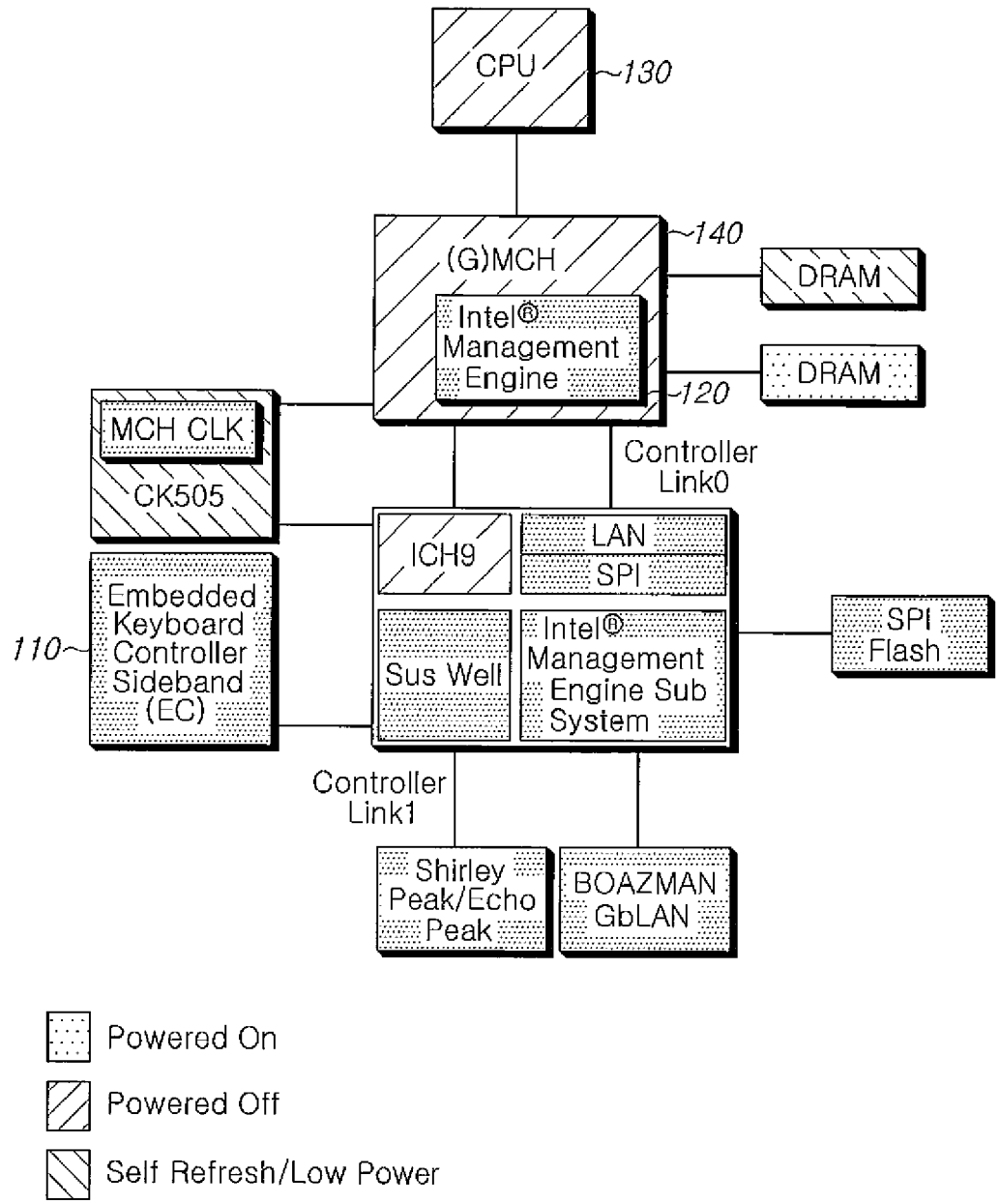
FIG. 2b is a block diagram showing power supplying states for respective constitutional components of a system in an S3 mode.

FIG. 2a is a block diagram showing power supplying states for respective constitutional components of a system in an S0 mode, and FIG. 2b is a block diagram showing power supplying states for respective constitutional components of a system in an S3 mode.

The apparatus for forcibly shutting down a system according to the first embodiment of the present invention may comprise an embedded controller (EC) 110 or a management engine (ME) 120 among the constitutional components of the system shown in FIGS. 2a and 2b.

Referring to FIGS. 2a and 2b, it is understood that power supply to the CPU 130 and north bridge (MCH) 140 is blocked as the power state of the system enters the S3 mode from the S0 mode. At this time, the CPU 130 or the north bridge 140 can be selected as a reference constitutional component corresponding to the S3 mode.

That is, when a control signal related to entering the S3 mode is received, the embedded controller 110 or the management engine 120 senses voltage supplied to the CPU 130 or the north bridge 140, and if the voltage supplied to the CPU 130 or the north bridge 140 is not 0V, it is determined that the system execution state is abnormal, thereby shutting down the system.

Next, according to a second embodiment of the present invention, the power state detection unit 20 detects a current power state of the system by sensing the power consumption of the system.

At this time, when the reception unit 10 receives a control signal related to system shutdown, the determination unit 30 determines whether the system execution state is normal depending on the power consumption of the system sensed by the power state detection unit 20. That is, if the power consumption of the system is higher than a reference value, it is determined that the system execution state is abnormal.

Here, the reference value is a value set based on the power consumption of the system measured when the system is normally shut down.

In the meantime, when the reception unit 10 receives a control signal related to entering a specific power saving mode, the determination unit 30 determines that the system execution state is abnormal if the power consumption of the system is higher than the reference value corresponding to the power saving mode.

For example, when a control signal related to entering any one of the S3, S4, and S5 modes is received, the determination unit 30 determines whether the system execution state is normal depending on whether the power consumption of the system is higher than the reference value corresponding to a corresponding power saving mode.

Here, the reference value is set based on the power consumption of the system measured when the system normally enters a specific power saving mode.

That is, a reference value corresponding to the S3 mode is set based on the power consumption of the system measured when the system normally enters the S3 mode. In the same manner, a reference value corresponding to the S4 mode is set based on the power consumption of the system measured when the system normally enters the S4 mode.

For example, if the power consumption of the system is 8 W in the S0 mode, the power consumption of the system is less than 2 W when the system normally enters the S3 mode, and the power consumption of the system is less than 1 W when the system normally enters the S4 or S5 mode, a reference value corresponding to the S3 mode is set to 2 W, and a reference value corresponding to the S4 or S5 mode is set to 1 W.

The apparatus for forcibly shutting down a system according to the second embodiment of the present invention may comprise an embedded controller (EC) 110 or a management engine (ME) 120 among the constitutional components of the system shown in FIGS. 2a and 2b.

That is, when a control signal related to entering the S3 mode is received, the embedded controller 110 or the management engine 120 measures the power consumption of the system. If the power consumption is higher than 2 W, it is determined that the system execution state is abnormal, and then, the system is forcibly shut down. In the same manner, when a control signal related to entering the S4 mode is received, the embedded controller 110 or the management engine 120 measures the power consumption of the system. If the power consumption is higher than 1 W, it is determined that the system execution state is abnormal, and then, the system is forcibly shut down.

Next, according to a third embodiment of the present invention, the power state detection unit 20 detects a current power state of the system by sensing a level of a power management signal indicating whether the system enters a specific power state.

At this time, when the reception unit 10 receives a control signal related to system shutdown, the determination unit 30 determines whether the system execution state is normal depending on whether a power management signal indicating that the system enters a system shutdown state is detected as an active state by the power state detection unit 20. That is, if the power management signal indicating that the system enters a system shutdown state is sensed as an inactive state, the determination unit 30 determines that the system execution state is abnormal.

Meanwhile, when the apparatus for forcibly shutting down a system according to the third embodiment of the present invention supports the ACPI power management specification and the reception unit 10 receives a control signal related to entering any one of the S3, S4, and S5 modes, the determination unit 30 determines that the system execution state is abnormal if a power management signal indicating that the system enters a corresponding mode is sensed as an inactive state.

Here, the power management signal indicating whether the system enters a specific power state includes SLP_S3#, SLP_S4#, SLP_S5#, SLP_M#, S4_STATE#, and the like.

The apparatus for forcibly shutting down a system according to the third embodiment of the present invention may comprise an embedded controller (EC) 110 or a management engine (ME) 120 among the constitutional components of the system shown in FIGS. 2a and 2b.

That is, when a control signal related to entering the S3 mode is received, the embedded controller 110 or the management engine 120 determines that the system execution state is abnormal and forcibly shuts down the system if SLP_S3#, which is a power management signal indicating that the system enters the S3 mode, is sensed as an inactive state.

Hereinafter, preferred embodiments of a method for forcibly shutting down a system according to the present invention will be described in detail with reference to the accompanying drawings.

Figure 3:
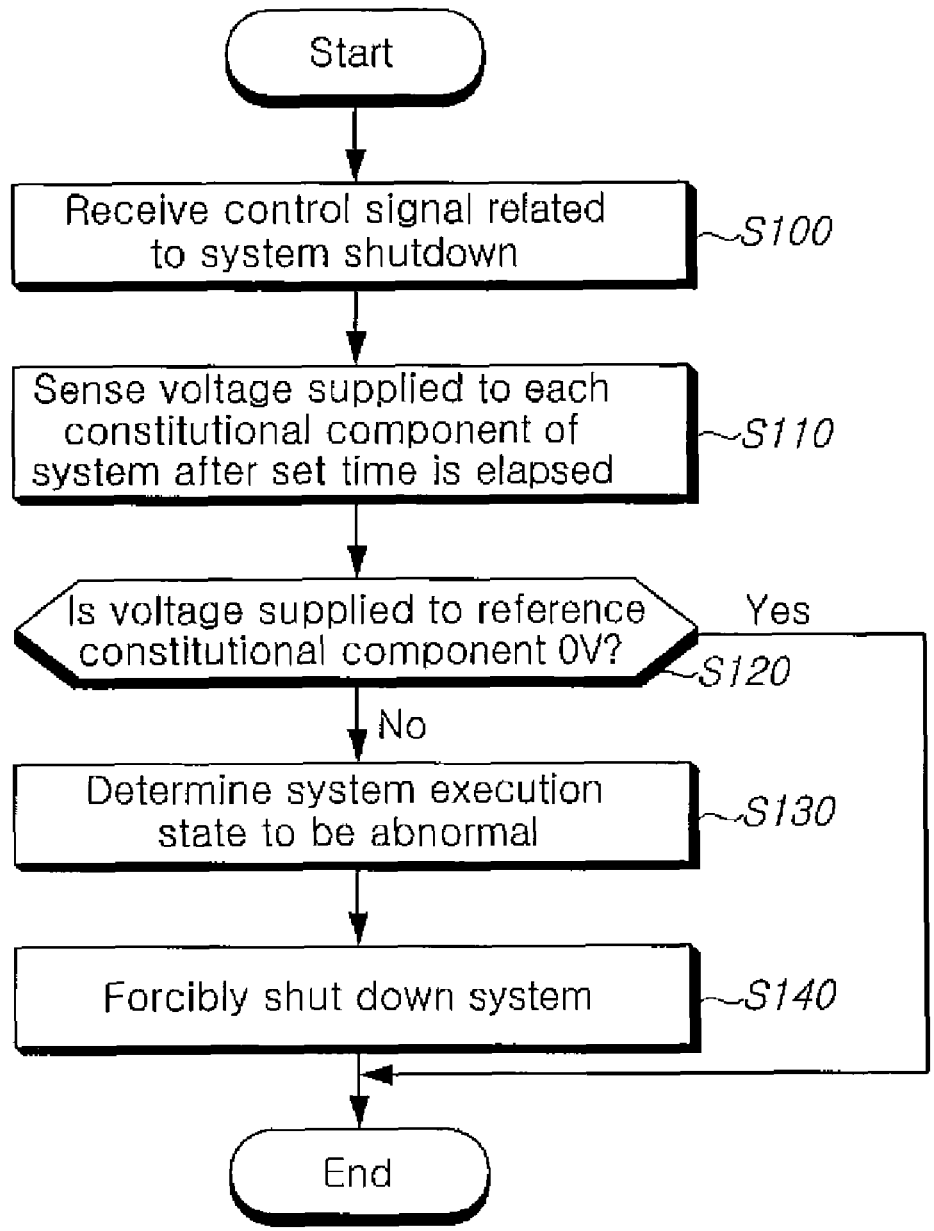
FIG. 3 is a flowchart specifically illustrating an example of a method for forcibly shutting down a system according to a first embodiment of the present invention.

FIG. 3 is a flowchart specifically illustrating an example of a method for forcibly shutting down a system according to the first embodiment of the present invention.

As shown in FIG. 3, the example of the method for forcibly shutting down a system according to the first embodiment of the present invention starts from the step of receiving a control signal related to system shutdown (step S100).

Further specifically, if a control signal related to system shutdown is generated by a processing unit based on a user command, preset conditions, or the like, the control signal transmitted from the processing unit is received.

For example, when a user inputs a system shutdown command, the processing unit transmits a control signal related to system shutdown.

Next, voltage supplied to each constitutional component of the system is sensed after a set time is elapsed (step S110).

This is to determine whether the system execution state is in a normal or abnormal state by detecting a current power state of the system using the voltage supplied to each constitutional component of the system.

At this time, the set time is set based on a time required to enter a system shutdown state.

Subsequently, it is determined whether the voltage supplied to a reference constitutional component is 0V (step S120). At this time, if the voltage supplied to the reference constitutional component is 0V, the method for forcibly shutting down a system according to the first embodiment of the present invention is terminated. Contrarily, if the voltage supplied to the reference constitutional component is not 0V, step S130 is performed.

Here, the reference constitutional component is a constitutional component to which power supply is suspended as the system enters the system shutdown state.

That is, any one of the constitutional components where power supply is suspended when the system normally enters the system shutdown state and thus the supplied voltage is detected to be 0V can be selected as the reference constitutional component.

Next, if the voltage supplied to the reference constitutional component is not 0V as a result of the determination in step S120, the system execution state is determined to be abnormal (step S130).

This is to determine that the system execution state is normal if the power supply to the reference constitutional component is suspended when a control signal related to system shutdown is received, and the system execution state is abnormal if the power supply to each constitutional component of the system is continued and the voltage supplied to each constitutional component of the system is sensed not to be 0V.

Subsequently, if the system execution state is determined to be abnormal, the system is forcibly shut down (step S140).

This is to prevent continuous consumption of system power and danger of accident occurring due to an increase in battery temperature when an error occurs in a computer system and the operation of the system is inadvertently suspended while the system is not shut down.

Figure 4:
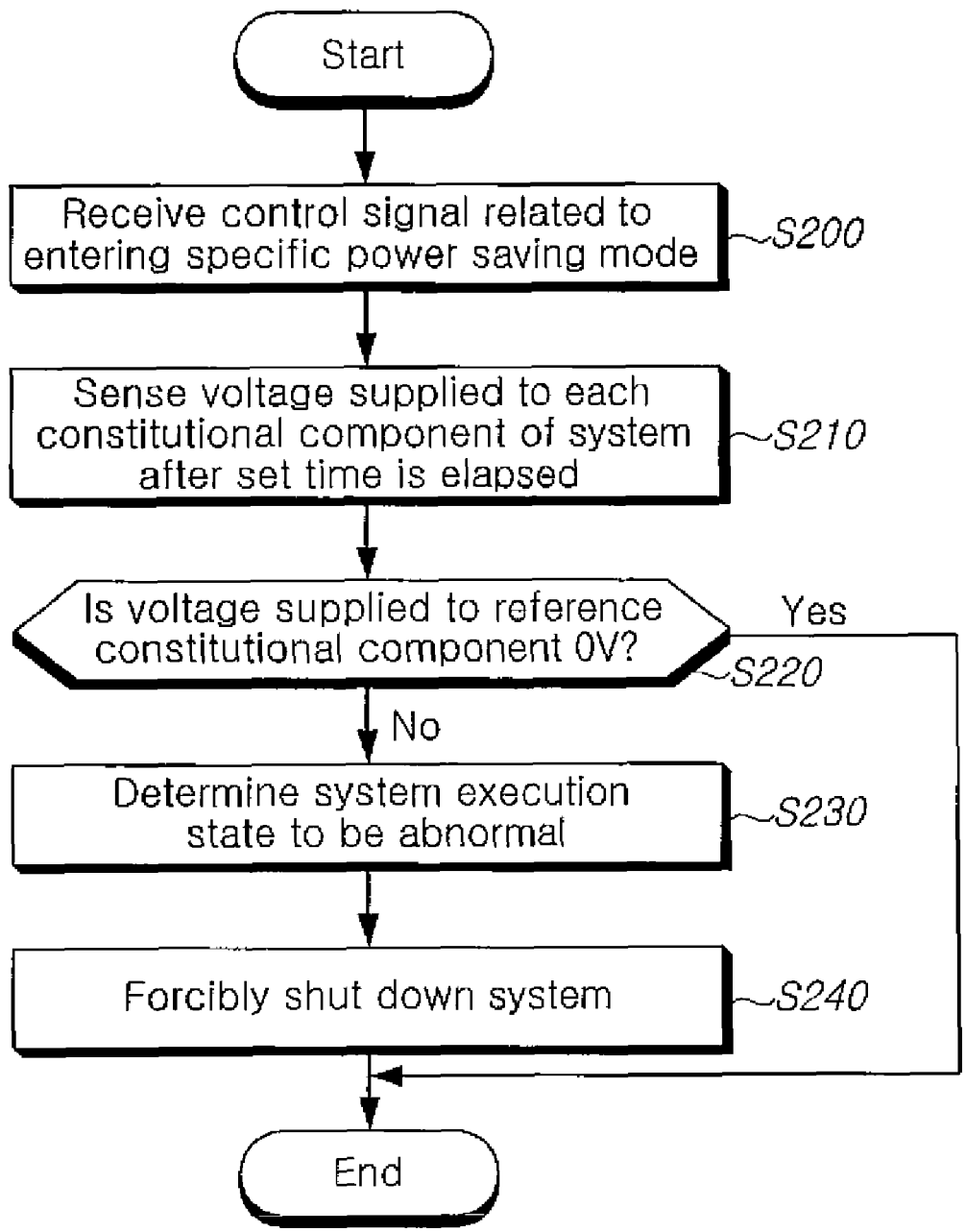
FIG. 4 is a flowchart specifically illustrating another example of the method for forcibly shutting down a system according to the first embodiment of the present invention.

FIG. 4 is a flowchart specifically illustrating another example of the method for forcibly shutting down a system according to the first embodiment of the present invention.

As shown in FIG. 4, the other example of the method for forcibly shutting down a system according to the first embodiment of the present invention starts from the step of receiving a control signal related to entering a specific power saving mode (step S200).

Then, voltage supplied to each constitutional component of the system is sensed after a set time is elapsed (step S210).

This is to determine whether the system execution state is in a normal or abnormal state by detecting a current power state of the system using the voltage supplied to each constitutional component of the system.

At this time, the set time is set based on a time required to enter a power state according to the power management control signal received in step S200.

Subsequently, it is determined whether the voltage supplied to a reference constitutional component is 0V (step S220). At this time, if the voltage supplied to the reference constitutional component is 0V, the method for forcibly shutting down a system according to the first embodiment of the present invention is terminated. Contrarily, if the voltage supplied to the reference constitutional component is not 0V, step S230 is performed.

Here, the reference constitutional component is a constitutional component to which power supply is suspended as the system enters a specific power saving mode.

For example, assuming power supply to the CPU is suspended when the system enters the S3 mode while the power is supplied to the CPU in the S0 mode, the CPU can be a reference constitutional component for determining whether the system enters the S3 mode. At this time, if the voltage supplied to the CPU is sensed not to be 0V, it is determined that the system execution state is abnormal.

That is, any one of constitutional components in which power is supplied in the S0 mode and power supply is suspended in the S3 mode can be selected as a reference constitutional component corresponding to the S3 mode.

Next, if the voltage supplied to the reference constitutional component is not 0V as a result of the determination in step S220, the system execution state is determined to be abnormal (step S230).

This is to determine that the system execution state is normal if the power supply to the reference constitutional component is suspended when a control signal related to entering a specific power saving mode is received, and the system execution state is abnormal if the power supply to the reference constitutional component is continued and the supplied voltage is sensed not to be 0V.

Subsequently, if the system execution state is determined to be abnormal, the system is forcibly shut down (step S240).

This is to prevent continuous consumption of system power and danger of accident occurring due to an increase in battery temperature when an error occurs in a computer system and the operation of the system is inadvertently suspended while the system does not normally enter any one power state among the S3, S4, and S5 modes.

Figure 5:
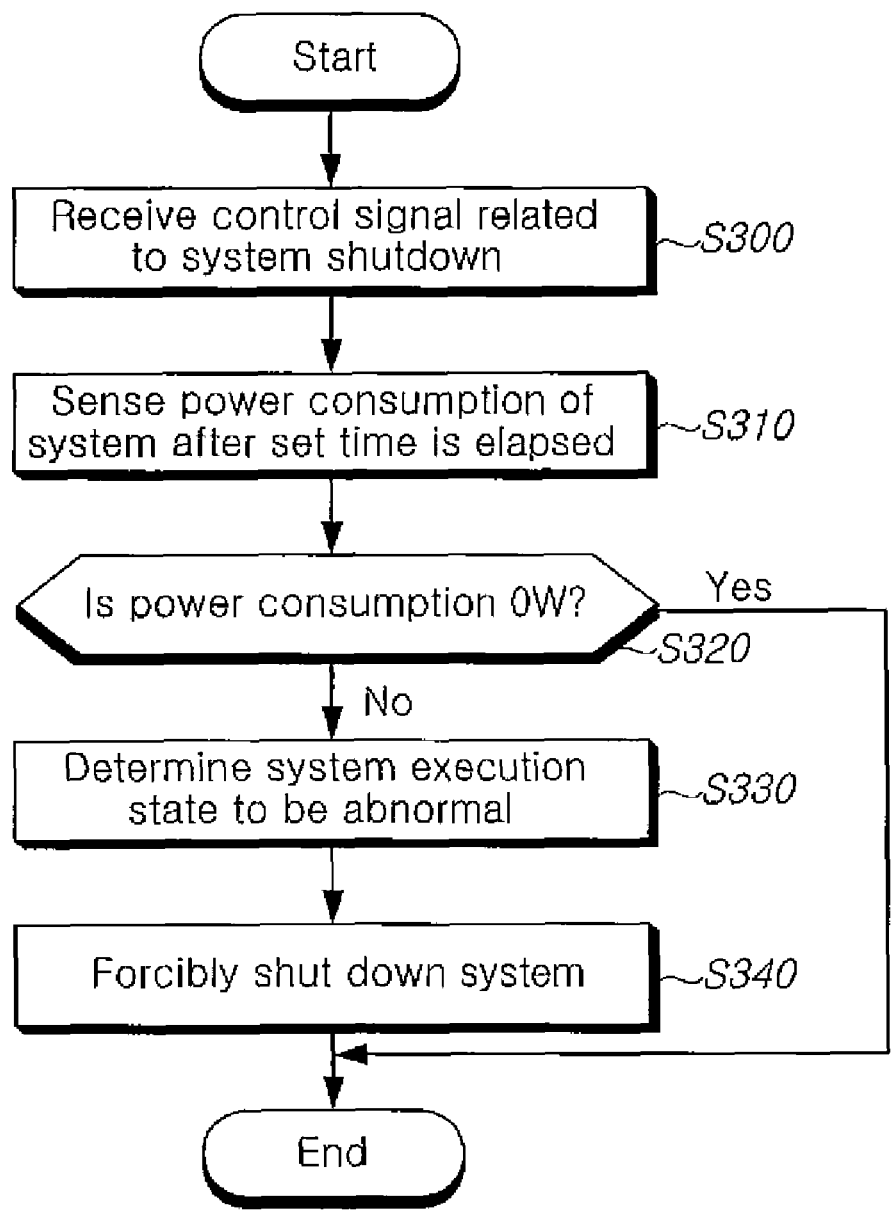
FIG. 5 is a flowchart specifically illustrating an example of a method for forcibly shutting down a system according to a second embodiment of the present invention.

FIG. 5 is a flowchart specifically illustrating an example of a method for forcibly shutting down a system according to the second embodiment of the present invention;

As shown in FIG. 5, the example of a method for forcibly shutting down a system according to the second embodiment of the present invention starts from the step of receiving a control signal related to system shutdown (step S300).

Next, power consumption of the system is sensed after a set time is elapsed (step S310).

This is to determine whether the system execution state is in a normal or abnormal state by detecting a current power state of the system using the power consumption of the system.

At this time, the set time is set based on a time required to enter a system shutdown state.

Subsequently, it is determined whether the power consumption is 0 W (step S320). At this time, if the power consumption of the system is 0 W, the method for forcibly shutting down a system according to the second embodiment of the present invention is terminated. Contrarily, if the power consumption is not 0 W, step S330 is performed.

Thereafter, if the power consumption of the system is not 0 W as a result of the determination in step S320, the system execution state is determined to be abnormal (step S330).

This is to determine that the system execution state is normal if the power supply to each constitutional component of the system is suspended when a control signal related to system shutdown is received, and the system execution state is abnormal if the power supply to each constitutional component of the system is continued and the power consumption of the system is sensed not to be 0 W.

Subsequently, if the system execution state is determined to be abnormal, the system is forcibly shut down (step S340).

This is to prevent continuous consumption of system power and danger of accident occurring due to an increase in battery temperature when an error occurs in a computer system and the operation of the system is inadvertently suspended while the system is not shut down.

Figure 6:
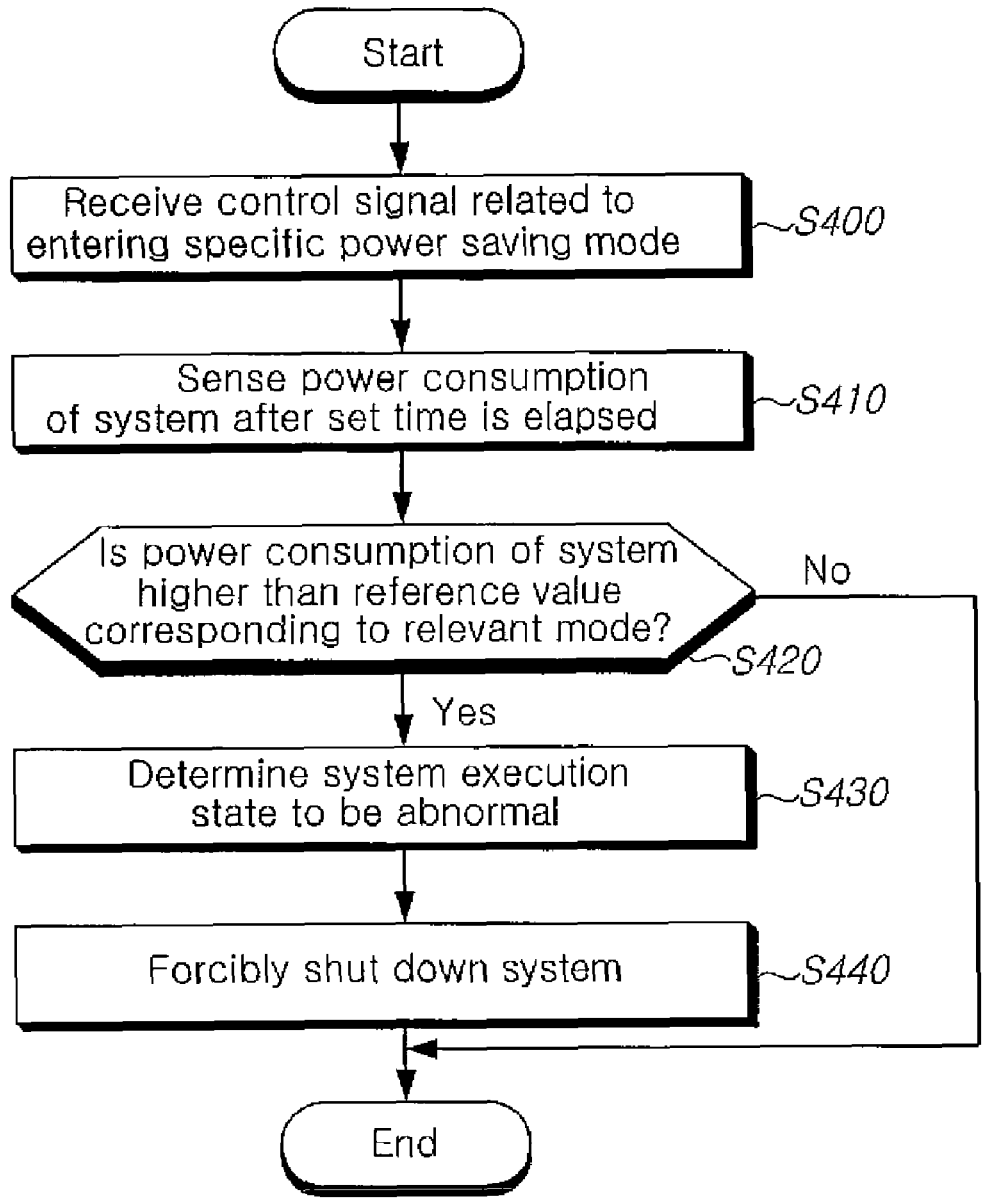
FIG. 6 is a flowchart specifically illustrating another example of the method for forcibly shutting down a system according to the second embodiment of the present invention.

FIG. 6 is a flowchart specifically illustrating another example of the method for forcibly shutting down a system according to the second embodiment of the present invention.

As shown in FIG. 6, the other example of the method for forcibly shutting down a system according to the second embodiment of the present invention starts from the step of receiving a control signal related to entering a specific power saving mode (step S400).

Next, power consumption of the system is sensed after a set time is elapsed (step S410).

This is to determine whether the system execution state is in a normal or abnormal state by detecting a current power state of the system using the power consumption of the system.

At this time, the set time is set based on a time required to enter a power state according to a power management control signal received in step S400.

Subsequently, it is determined whether the power consumption of the system is higher than a reference value corresponding to a relevant mode (step S420). At this time, if the power consumption of the system is not higher than the reference value corresponding to the relevant mode, step S400 is performed. Contrarily, if the power consumption of the system is higher than a reference value corresponding to the relevant mode, step S430 is performed.

Here, the reference value is set based on the power consumption of the system measured when the system normally enters a specific power saving mode.

That is, a reference value corresponding to the S3 mode is set based on the power consumption of the system measured when the system normally enters the S3 mode. In the same manner, a reference value corresponding to the S4 mode is set based on the power consumption of the system measured when the system normally enters the S4 mode.

For example, if the power consumption of the system is 8 W in the S0 mode, the power consumption of the system is less than 2 W when the system normally enters the S3 mode, and the power consumption of the system is less than 1 W when the system normally enters the S4 or S5 mode, a reference value corresponding to the S3 mode is set to 2 W, and a reference value corresponding to the S4 or S5 mode is set to 1 W.

Next, it is determined that the system execution state is abnormal if the power consumption of the system is higher than the reference value corresponding to the power saving mode as a result of the determination in step S420.

This is to determine that the system execution state is normal if the power consumption of the system is less than a reference value corresponding to a relevant mode when a control signal related to entering a specific power saving mode is received, and the system execution state is abnormal if power supply to each constitutional component of the system is continued and the power consumption of the system is sensed to be higher than a reference value corresponding to the relevant mode.

Subsequently, if the system execution state is determined to be abnormal, the system is forcibly shut down (step S440).

This is to prevent continuous consumption of system power and danger of accident occurring due to an increase in battery temperature when an error occurs in a computer system and the operation of the system is inadvertently suspended while the system does not normally enter any one power state among the power saving modes.

Figure 7:
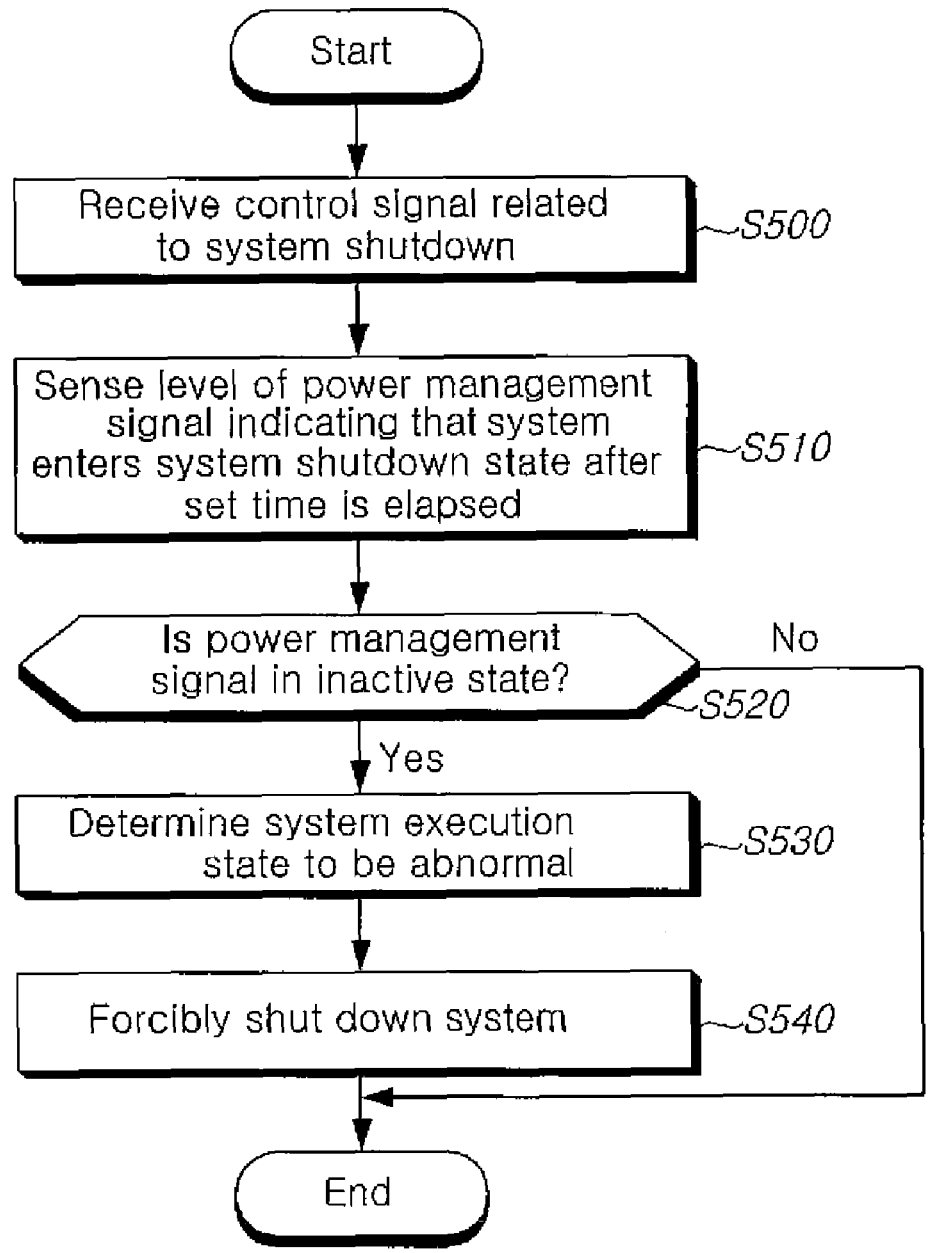
FIG. 7 is a flowchart specifically illustrating an example of a method for forcibly shutting down a system according to a third embodiment of the present invention.

FIG. 7 is a flowchart specifically illustrating an example of a method for forcibly shutting down a system according to the third embodiment of the present invention.

As shown in FIG. 7, the example of the method for forcibly shutting down a system according to the third embodiment of the present invention starts from the step of receiving a control signal related to system shutdown (step S500).

Next, a level of a power management signal indicating that the system enters a system shutdown state is sensed after a set time is elapsed (step S510).

This is to determine whether the system execution state is in a normal or abnormal state by detecting a current power state of the system using the level of the power management signal.

At this time, the set time is set based on a time required to enter a system shutdown state.

Subsequently, it is determined whether the power management signal indicating that the system enters a system shutdown state is in an inactive state (step S520). At this time, if the power management signal is in an inactive state, step S530 is performed. Contrarily, if the power management signal is in an active state, the method for forcibly shutting down a system according to the third embodiment of the present invention is terminated.

Next, if the power management signal indicating that the system enters a system shutdown state is in an inactive state as a result of the determination in step S520, the system execution state is determined to be abnormal (step S530).

This is to determine that the system execution state is normal if the power supply to each constitutional component of the system is suspended when a control signal related to system shutdown is received, and the system execution state is abnormal if the power management signal indicating that the system enters a system shutdown state is sensed to be in an inactive state.

Subsequently, if the system execution state is determined to be abnormal, the system is forcibly shut down (step S540).

This is to prevent continuous consumption of system power and danger of accident occurring due to an increase in battery temperature when an error occurs in a computer system and the operation of the system is inadvertently suspended while the system is not shut down.

Figure 8:
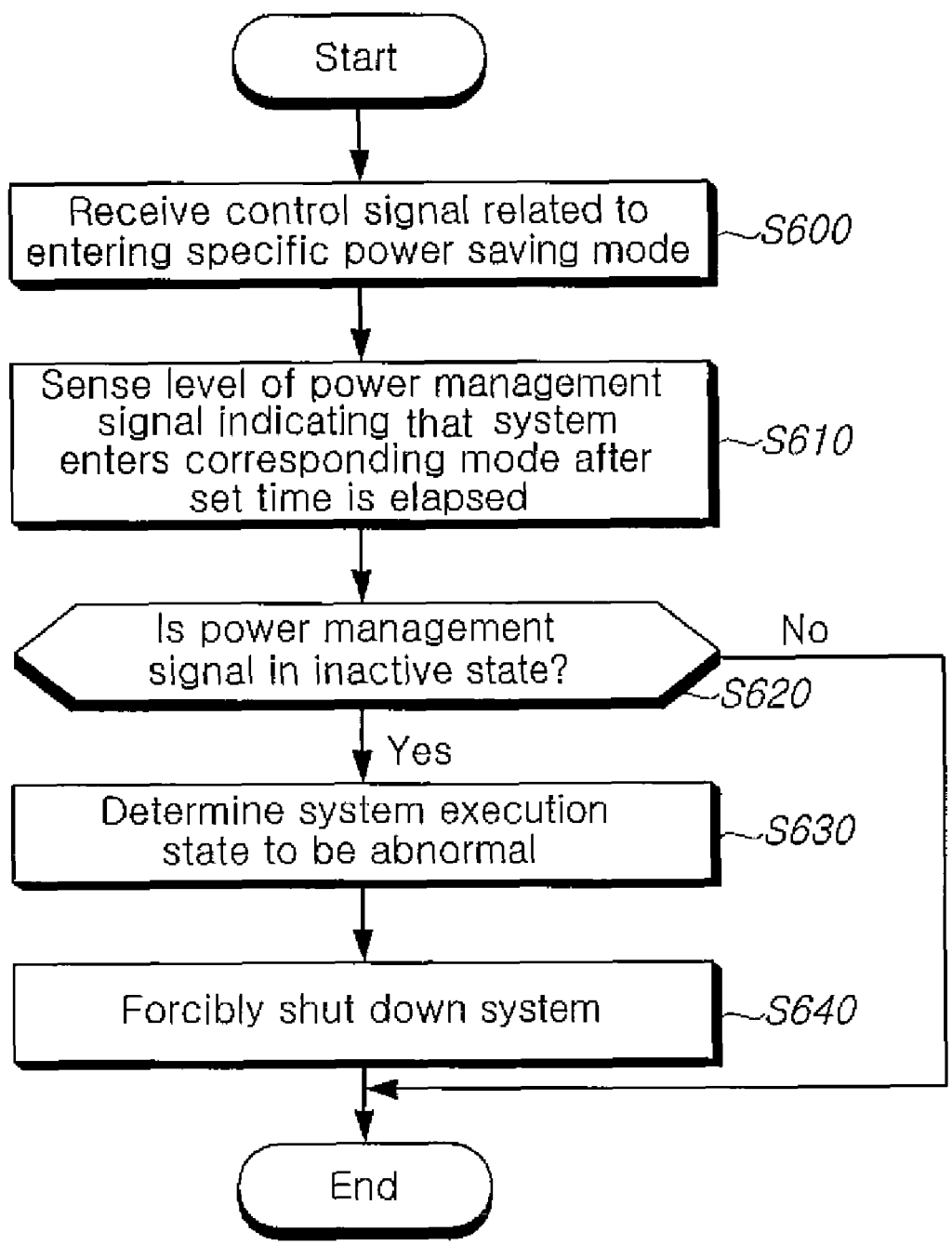
FIG. 8 is a flowchart specifically illustrating another example of the method for forcibly shutting down a system according to the third embodiment of the present invention.

FIG. 8 is a flowchart specifically illustrating another example of the method for forcibly shutting down a system according to the third embodiment of the present invention.

As shown in FIG. 8, the other example of the method for forcibly shutting down a system according to the third embodiment of the present invention starts from the step of receiving a control signal related to entering a specific power saving mode (step S600).

Next, a level of a power management signal indicating that the system enters the corresponding mode is sensed after a set time is elapsed (step S610).

This is to determine whether the system execution state is in a normal or abnormal state by detecting a current power state of the system using the level of the power management signal.

At this time, the set time is set based on a time required to enter a power state according to the power management control signal received in step S600.

Subsequently, it is determined whether the power management signal indicating that the system enters a corresponding mode is in an active state (step S620). At this time, if the power management signal is in an inactive state, step S630 is performed. Contrarily, if the power management signal is in an active state, the method for forcibly shutting down a system according to the third embodiment of the present invention is terminated.

Here, the power management signal indicating whether the system enters a specific power state includes SLP_S3#, SLP_S4#, SLP_S5#, SLP_M#, S4_STATE#, and the like.

For example, when a control signal related to entering the S3 mode is received, step S630 is performed if SLP_S3#, which is a power management signal indicating that the system enters the S3 mode, is sensed as an inactive state.

Next, if the power management signal indicating that the system enters the corresponding mode is in an inactive state as a result of the determination in step S620, the system execution state is determined to be abnormal (step S630).

This is to determine that the system execution state is normal if the power management signal indicating that the system enters the corresponding mode is sensed to be in an active state when a control signal related to entering any one of the S3, S4, and S5 modes is received, and the system execution state is abnormal if the power management signal indicating that the system enters the corresponding mode is sensed to be in an inactive state and thus power supply to each constitutional component of the system is continued.

Subsequently, if the system execution state is determined to be abnormal, the system is forcibly shut down (step S640).

This is to prevent continuous consumption of system power and danger of accident occurring due to an increase in battery temperature when an error occurs in a computer system and the operation of the system is inadvertently suspended while the system does not normally enter any one power state among the S3, S4, and S5 modes.

It has been described that whether a system execution state is normal is determined by comparing a received power management control signal and a result of detecting a current power state of the system in the method for forcibly shutting down a system according to the first to third embodiments of the present invention.

Meanwhile if the power management control signal does not correspond to a result of detection in the method for forcibly shutting down a system according to each embodiment of the present invention, the step of determining whether the system execution state is normal may be performed by additionally transmitting a response request message to each constitutional component of the system and receiving a response message corresponding to the response request message.

The scope of the present invention is not limited to the embodiments described above but is defined by the claims. It will be apparent that those skilled in the art can make various modifications and changes thereto within the scope of the invention defined by the claims.

What is claimed is:

1. An apparatus for forcibly shutting down a system, comprising:
a reception unit configured to receive a power management control signal related to a system shutdown or related to entering a specific power saving mode;
a power state detection unit configured to detect a current power state of the system after a set time has elapsed from when the reception unit receives the power management control signal, wherein the power state detection unit detects the current power state of the system by sensing voltage supplied to each constitutional component of the system;
a determination unit configured to determine whether a system execution state is normal by comparing the power management control signal received by the reception unit and a detection result of the power state detection unit; and
a forced-shutdown unit configured to forcibly shut down the system when the system execution state is determined to be abnormal by the determination unit.

2. The apparatus as claimed in claim 1, wherein when the reception unit receives a control signal related to the system shutdown, the detection unit determines the system execution state to be abnormal if voltage supplied to a reference constitutional component for determining whether the system enters a system shutdown state is not 0V.

3. The apparatus as claimed in claim 2, wherein when the reception unit receives a control signal related to entering the specific power saving mode, the determination unit determines the system execution state to be abnormal if voltage supplied to a reference constitutional component for determining whether the system enters the power saving mode is not 0V.

4. The apparatus as claimed in claim 3, wherein the reference constitutional component is a constitutional component to which power supply is suspended as the system enters the system shutdown or power saving mode.

5. The apparatus as claimed in claim 1, wherein the power state detection unit detects the current power state of the system by sensing power consumption of the system.

6. The apparatus as claimed in claim 5, wherein when the reception unit receives a control signal related to the system shutdown, the determination unit determines the system execution state to be abnormal if the power consumption of the system is higher than a reference value.

7. The apparatus as claimed in claim 6, wherein when the reception unit receives a control signal related to entering the specific power saving mode, the determination unit determines the system execution state to be abnormal if the power consumption of the system is higher than a reference value corresponding to the power saving mode.

8. The apparatus as claimed in claim 7, wherein the reference value is set based on power consumption of the system measured when the system normally enters the system shutdown or power saving mode.

9. The apparatus as claimed in claim 1, wherein the power state detection unit detects the current power state by sensing a level of a power management signal indicating whether the system enters a specific power state.

10. The apparatus as claimed in claim 9, wherein when the reception unit receives a control signal related to the system shutdown, the determination unit determines the system execution state to be abnormal if the power management signal indicating that the system enters a system shutdown state is sensed to be in an inactive state.

11. The apparatus as claimed in claim 10, wherein when the reception unit receives a control signal related to entering the specific power saving mode, the determination unit determines the system execution unit to be abnormal if the power management signal indicating that the system enters the power saving mode is sensed to be in an inactive state.

12. The apparatus as claimed in claim 1, wherein when the power management control signal received by the reception unit does not correspond to the detection result of the power state detection unit, the determination unit determines whether the system execution state is normal by transmitting a response request message to each constitutional component of the system and receiving a response message corresponding to the response request message.

13. A method for forcibly shutting down a system, comprising the steps of:
   (a) receiving a power management control signal related to a system shutdown or related to entering a specific power saving mode;
   (b) detecting a current power state of the system by sensing voltage supplied to each constitutional component of the system after a set time has elapsed from when the power management control signal is received;
   (c) determining whether a system execution state is normal by comparing the power management control signal and a result of the detection; and
   (d) forcibly shutting the system when the system execution state is determined to be abnormal.

14. The method as claimed in claim 13, wherein step (b) is performed by sensing power consumption of the system.

15. The method as claimed in claim 13, wherein step (b) is performed by sensing a level of a power management signal indicating whether the system enters a specific power state.

16. The method as claimed in claim 13, wherein when the control signal does not correspond to the result of the detection, step (c) is performed by determining whether the system execution state is normal by transmitting a response request message to each constitutional component of the system and receiving a response message corresponding to the response request message.

* * * * *